(12) United States Patent
Fuller et al.

(10) Patent No.: US 7,888,433 B2
(45) Date of Patent: *Feb. 15, 2011

(54) SULFONATED-POLYPERFLUORO-CYCLOBUTANE-POLYPHENYLENE POLYMERS FOR PEM FUEL CELL APPLICATIONS

(75) Inventors: Timothy J. Fuller, Pittsford, NY (US); Sean M Mackinnon, West Henrietta, NY (US); Michael R. Schoeneweiss, W. Henrietta, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/197,545

(22) Filed: Aug. 25, 2008

(65) Prior Publication Data

US 2009/0281270 A1 Nov. 12, 2009

Related U.S. Application Data

(60) Provisional application No. 61/052,159, filed on May 9, 2008.

(51) Int. Cl.
*C08F 214/14* (2006.01)
(52) U.S. Cl. .................. 525/326.2; 526/250; 526/252; 526/253; 526/254
(58) Field of Classification Search .............. 525/326.2; 526/250, 252, 253, 254
See application file for complete search history.

(56) References Cited

U.S. PATENT DOCUMENTS

| | | | |
|---|---|---|---|
| 5,021,602 A | 6/1991 | Clement et al. |
| 5,037,917 A | 8/1991 | Babb et al. |
| 5,066,746 A | 11/1991 | Clement et al. |
| 5,159,037 A | 10/1992 | Clement et al. |
| 5,159,038 A | 10/1992 | Babb et al. |
| 5,316,871 A | 5/1994 | Swathirajan et al. |
| 5,910,378 A | 6/1999 | Debe et al. |
| 6,124,060 A | 9/2000 | Akita et al. |
| 6,183,668 B1 | 2/2001 | Debe et al. |
| 6,277,512 B1 | 8/2001 | Hamrock et al. |
| 6,384,167 B2 | 5/2002 | DesMarteau et al. |
| 6,444,343 B1 | 9/2002 | Prakash et al. |
| 6,521,381 B1 | 2/2003 | Vyas et al. |
| 6,523,699 B1 | 2/2003 | Akita et al. |
| 6,559,237 B1 | 5/2003 | Mao et al. |
| 6,670,065 B2 | 12/2003 | Koyama et al. |
| 6,847,518 B2 | 1/2005 | Inoue et al. |
| 6,875,537 B2 | 4/2005 | Tani et al. |
| 6,926,984 B2 | 8/2005 | Asano et al. |
| 6,933,068 B2 | 8/2005 | Asano et al. |
| 6,953,653 B2 * | 10/2005 | Smith et al. .................. 430/321 |
| 6,986,962 B2 | 1/2006 | Oyanagi et al. |
| 7,001,929 B2 | 2/2006 | Goto et al. |
| 7,045,241 B2 | 5/2006 | Akita et al. |
| 7,094,851 B2 | 8/2006 | Wu et al. |
| 2001/0018144 A1 | 8/2001 | Watakabe et al. |
| 2002/0014405 A1 | 2/2002 | Arcella et al. |
| 2003/0017379 A1 | 1/2003 | Menashi |
| 2003/0096149 A1 | 5/2003 | Koyama et al. |
| 2003/0180596 A1 | 9/2003 | Yoshimura et al. |
| 2004/0214058 A1 | 10/2004 | Tada et al. |
| 2004/0214065 A1 | 10/2004 | Kanaoka et al. |
| 2005/0014927 A1 | 1/2005 | Akita |
| 2005/0043487 A1 | 2/2005 | Felix et al. |
| 2005/0048342 A1 | 3/2005 | Wakahoi et al. |
| 2005/0053810 A1 | 3/2005 | Kato et al. |
| 2005/0058864 A1 | 3/2005 | Goebel |
| 2005/0064260 A1 | 3/2005 | Otsuki et al. |
| 2005/0100770 A1 | 5/2005 | Sugawara et al. |
| 2005/0106440 A1 | 5/2005 | Komiya |
| 2005/0116206 A1 | 6/2005 | Kakuta et al. |
| 2005/0130024 A1 | 6/2005 | Otsuki et al. |
| 2005/0142397 A1 | 6/2005 | Wakahoi et al. |
| 2005/0143530 A1 | 6/2005 | Iwadate et al. |
| 2005/0175886 A1 | 8/2005 | Fukuda et al. |
| 2005/0197467 A1 | 9/2005 | Komiya et al. |
| 2005/0227138 A1 | 10/2005 | Fukuda et al. |
| 2005/0233181 A1 | 10/2005 | Wariishi et al. |
| 2005/0260474 A1 | 11/2005 | Asano et al. |
| 2006/0019147 A1 | 1/2006 | Fukuda et al. |
| 2006/0127728 A1 | 6/2006 | Otsuki et al. |
| 2006/0177719 A1 | 8/2006 | Fuller et al. |

(Continued)

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009249487 * | 4/2008 |
| JP | 2009249487 A | 10/2009 |
| WO | 2004/051776 | 6/2004 |
| WO | 2007/052954 A1 | 5/2007 |

OTHER PUBLICATIONS

Budy, S.M. et al., "Facile preparation of fluorovinylene aryl ether telechelic polymers with dual functionality for thermal chain extension and tandem crosslinking," Chem. Commun. 2006, pp. 4844-4846, 2006.

(Continued)

*Primary Examiner*—Bernard Lipman
(74) *Attorney, Agent, or Firm*—Brooks Kushman P.C.

(57) ABSTRACT

A polymer for ion conductor applications includes a polymer segment having a perfluorocyclobutyl moiety and a polymer segment not having such a moiety. One of these polymer segments is sulfonated to improve ionic conductivity. Fuel cells incorporating the ion conducting polymers are provided.

15 Claims, 5 Drawing Sheets

U.S. PATENT DOCUMENTS

| | | |
|---|---|---|
| 2007/0042242 A1 | 2/2007 | Tada et al. |
| 2007/0099054 A1 | 5/2007 | Fuller et al. |
| 2007/0141237 A1 | 6/2007 | Okiyama et al. |
| 2008/0027152 A1 | 1/2008 | Maier et al. |
| 2009/0278083 A1 | 11/2009 | Fuller et al. |

OTHER PUBLICATIONS

Li, Z. et al., A Novel Bisphenol Monomer with Grafting Capability and the Resulting Poly(arylene ether sulfone)s, Macromolecules 2006, 39, pp. 6990-6996.

Matsumura, S. et al., Iononners for Proton Exchange Membrane Fuel Cells with Sulfonic Acid Groups on the End Groups: Novel Branched Poly(eteher-ketone)s, Macromolecules 2008, 41, pp. 281-284.

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perlluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

| $Z_1(Z_2)$ | $Z_2(Z_1)$ | $L_1$ | Remarks |
|---|---|---|---|
| -C(=O)Cl | HO- | -C(=O)-O- | |
| -NCO | HO- | -NH-C(=O)-O- | |
| -OH | $X_5$-C₆H₄-Z-C₆H₄- | -O-C₆H₄-Z-C₆H₄- | $X_5$ is F, Cl; Z is CO, SO, SO₂ |
| -OH | F₂C=CF-O- | -O-CF=CF-O- | |
| -OH | F₂C=CF-O- | -O-CF₂-CHFO- | |
| -NH₂ | phthalic anhydride | phthalimide | |
| -NH₂ | -C(=O)Cl | -NH-C(=O)- | |
| -NH₂ | OCN- | -NH-C(=O)-NH- | |

Figure 3A

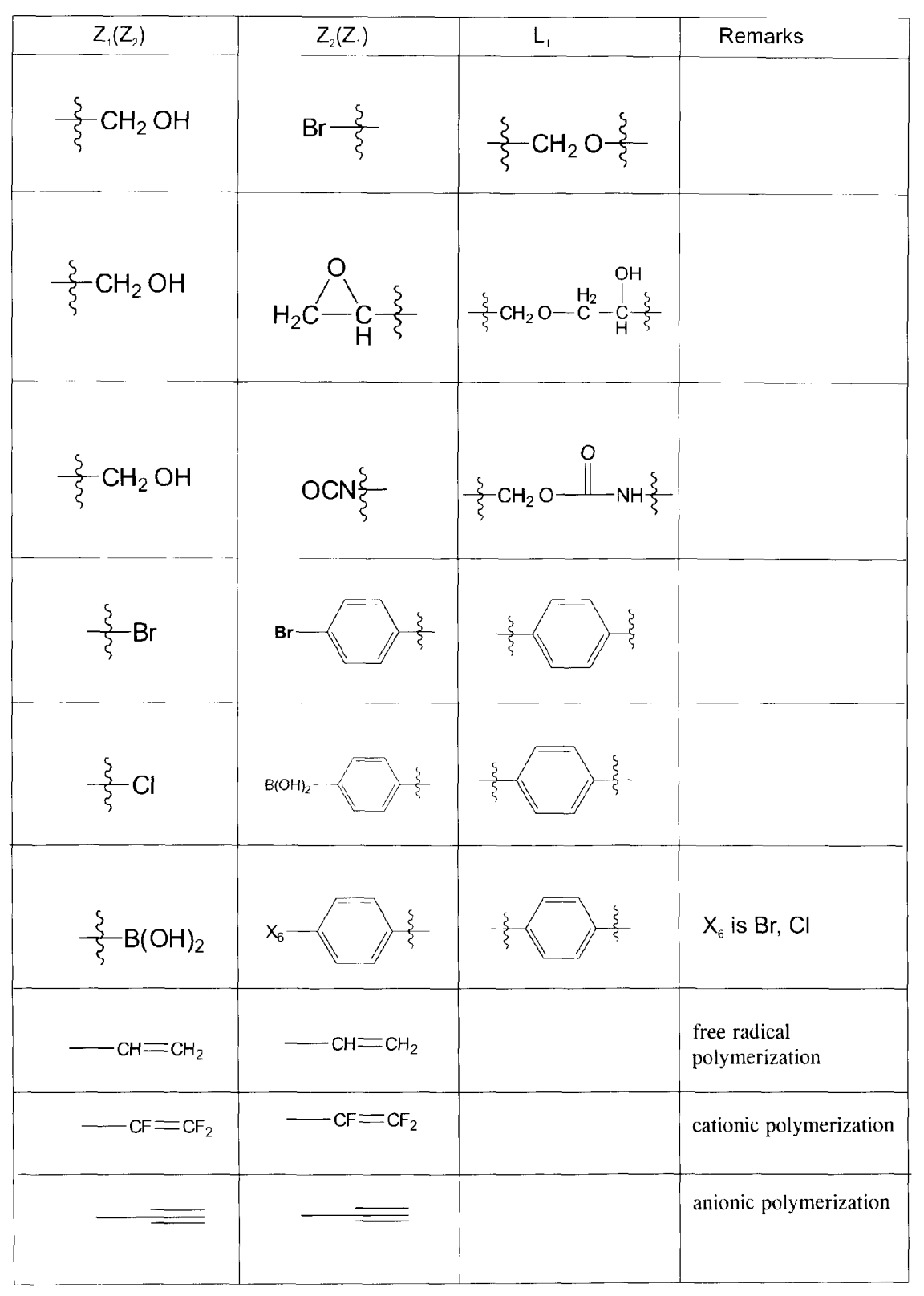

| $Z_1(Z_2)$ | $Z_2(Z_1)$ | $L_1$ | Remarks |
|---|---|---|---|
| —CH₂OH | Br— | —CH₂O— | |
| —CH₂OH | H₂C—CH— (epoxide) | —CH₂O—CH₂—CH(OH)— | |
| —CH₂OH | OCN— | —CH₂O—C(=O)—NH— | |
| —Br | Br—C₆H₄— | —C₆H₄— | |
| —Cl | B(OH)₂—C₆H₄— | —C₆H₄— | |
| —B(OH)₂ | X₆—C₆H₄— | —C₆H₄— | $X_6$ is Br, Cl |
| —CH=CH₂ | —CH=CH₂ | | free radical polymerization |
| —CF=CF₂ | —CF=CF₂ | | cationic polymerization |
| —C≡CH | —C≡CH | | anionic polymerization |

Figure 3B

SULFONATED-POLYPERFLUORO-CYCLOBUTANE-POLYPHENYLENE POLYMERS FOR PEM FUEL CELL APPLICATIONS

CROSS-REFERENCE TO RELATED APPLICATIONS

This application claims the benefit of U.S. provisional application Ser. No. 61/052,159 filed May. 9, 2008.

TECHNICAL FIELD

The field to which the disclosure generally relates includes polymer electrolyte and fuel cells.

BACKGROUND

Polymer electrolytes play an important part in electrochemical devices such as batteries and fuel cells. To achieve optimal performance, the polymer electrolyte must maintain a high ionic conductivity and mechanical stability at both high and low relative humidity. The polymer electrolyte also needs to have excellent chemical stability for long product life and robustness. Random copolymers have been explored as electrolytes for fuel cells. Due to their inherent random chain configuration, however, random copolymers typically suffer from water swelling at high humidity and excess membrane shrinkage at low humidity. A random copolymer membrane lacks the mechanical robustness to withstand the rigors of hydration and dehydration within an operating fuel cell. Thus, there is a need for an improved polymer electrolyte that maintains robust mechanical properties and high ionic conductivity at wide range of humidity conditions.

Accordingly, an improved polymer electrolyte molecular architecture and a process of synthesizing such a polymer electrolyte are desired.

SUMMARY OF THE INVENTION

The present invention solves one or more problems of the prior art by providing in at least one embodiment a polymer composition comprising polymer segments 1 and 2:

$$E_1(Z_1)_d\text{—}P_1\text{-}Q_1\text{-}P_2 \quad [1]$$

$$E_2(Z_1)_f\text{—}P_3 \quad [2]$$

wherein:

$Z_1$ is a protogenic group such as —$SO_2X$, —$PO_3H_2$, —COX, and the like;

$E_1$, $E_2$ is an aromatic or aliphatic-containing moiety wherein at least one of $E_1$ and $E_2$ include an aromatic substituted with $Z_1$;

X is an —OH, a halogen, an ester, or

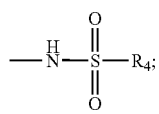

d is the number of $Z_1$ functional groups attached to $E_1$;
f is the number of $Z_1$ functional groups attached to $E_2$;
$P_1$, $P_2$, $P_3$, $P_4$ are each independently absent, —O—, —S—, —SO—, —$SO_2$—, —CO—, —NH—, $NR_2$—, or —$R_3$—, and $R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero d is zero.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIGS. 3A and 3B provide a table that provides endcap groups and the associated linking groups.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block", "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
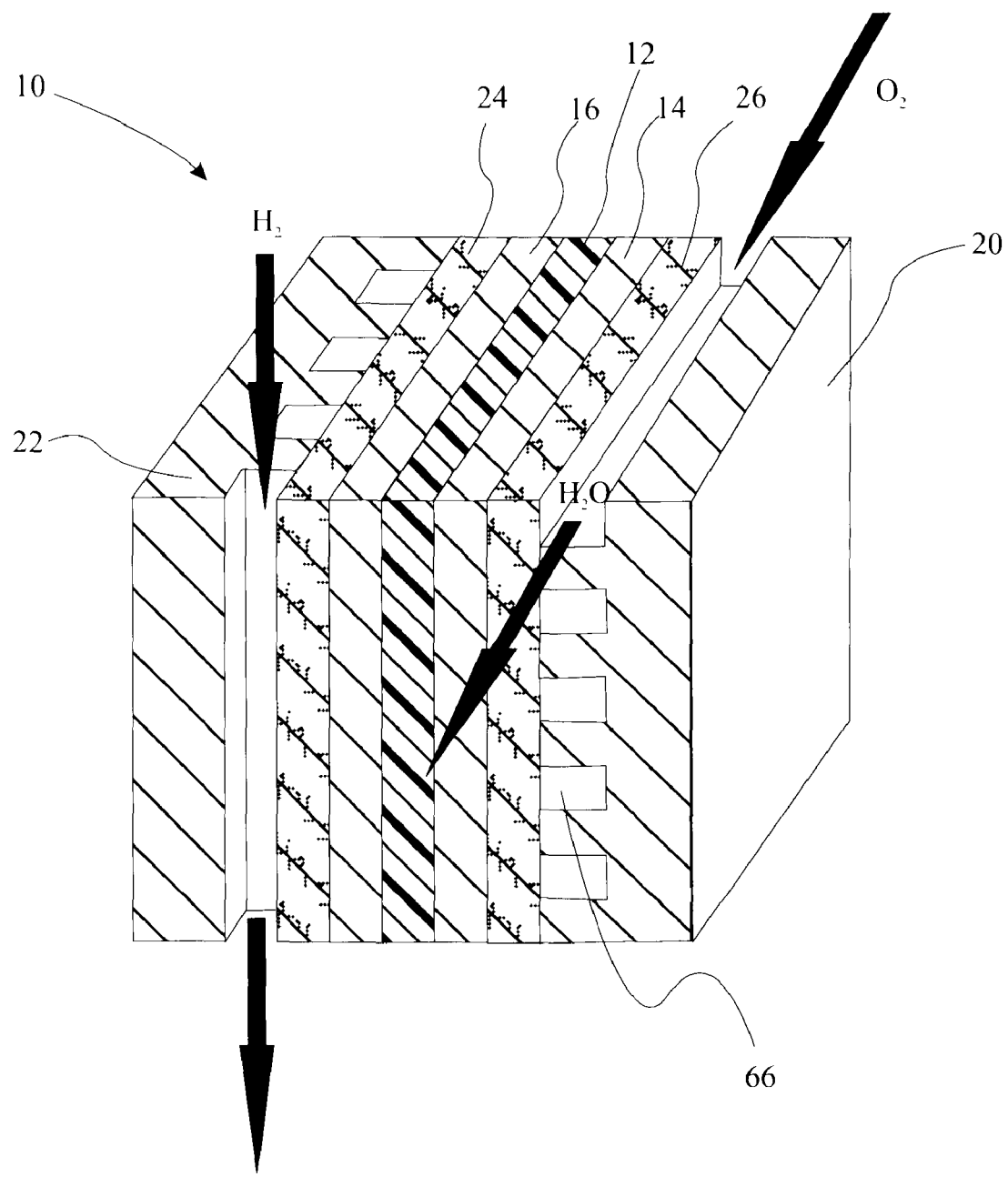
FIG. 1 provides a schematic illustration of a fuel cell incorporating the polymers of an embodiment of the present invention.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 60 and 66, and gas diffusion layers 24 and 26.

In an embodiment of the present invention, a block copolymer comprises a sulfonatable or sulfonated polymer segment and an unsulfonatable or un-sulfonated polymer segment. An example of the block copolymer of at least one embodiment comprises polymer segments 1 and 2:

$$E_1(Z_1)_d\text{—}P_1\text{-}Q_1\text{-}P_2 \quad [1]$$

$$E_1(Z_1)_f\text{—}P_3 \quad [2]$$

wherein:

$Z_1$ is a protogenic group such as —$SO_2X$, —$PO_3H_2$, —COX, and the like;

$E_1$, $E_2$ is an aromatic or aliphatic-containing moiety wherein at least one of $E_1$ and $E_2$ include an aromatic group substituted with $Z_1$;

X is an —OH, a halogen, an ester, or

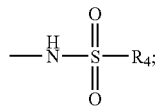

d is the number of $Z_1$ functional groups attached to $E_1$; In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average;

f is the number of $Z_1$ functional groups attached to $E_2$; In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average;

$P_1$, $P_2$, $P_3$ are each independently absent, —O—, —S—, —SO—, —$SO_2$—, —CO—, —NH—, $NR_2$—, —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero d is zero.

j is a number representing the repetition of a polymer segment 2.

$$E_1\text{-}P_1\text{-}Q_1\text{-}P_2$$

In a variation of the present embodiment, polymer segment 1 is formed by sulfonating one or both of the following polymer segments:

$$E_1\text{-}P_1\text{-}Q_1\text{-}P_2$$

$$E_2\text{-}P_3$$

In another variation of the present embodiment, polymer segments 1 and 2 are repeated to form polymer units 3 and 4:

 [3]

 [4]

wherein:

i is a number representing the repetition of polymer segment 1 to define polymer unit 3; and j is a number representing the repetition of a polymer segment 2 to define polymer unit 4.

Polymer segments 1 and 2 and polymer units 3 and 4 may be incorporated into various types of polymers. For example, these moieties may be used to construct block copolymers, random copolymers, and the like. In a refinement of this variation, i and j are each independently from 1 to 500. In another refinement of this variation, i and j are each independently from 1 to 200. In still another refinement of this variation, i and j are each independently from 1 to 35. In yet another refinement of this variation, i and j are each independently from 5 to 60. In yet another refinement of this variation, i and j are each independently from 5 to 35.

In another variation of the present invention, $Q_1$, $Q_2$ are perfluorocyclobutyl moieties. Examples of perfluorocyclobutyl moieties may include, but are not limited to formulas 5 or 6

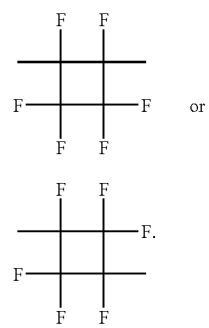

In still another variation of the present embodiment, polymer segments 3 and 4 are linked together to form polymer segments 7 and/or 8:

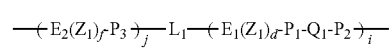 [7]

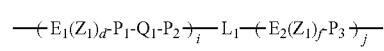 [8]

where $L_1$ is absent or a linking group.

In a variation of the present embodiment, polymer segments 7 and/or 8 may be repeated to form:

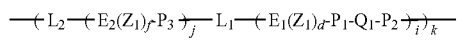 [9]

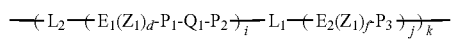 [10]

where $L_2$ is absent or a linking group and k is an integer representing the repetition of the polymer units 7 or 8.

In another variation of the present invention, $L_1$ and $L_2$ each independently comprise an ether, imide, amide, ester, amine, ketone or acyl groups. Examples of $L_1$ and $L_2$ may include, but are not limited to, the following linking groups:

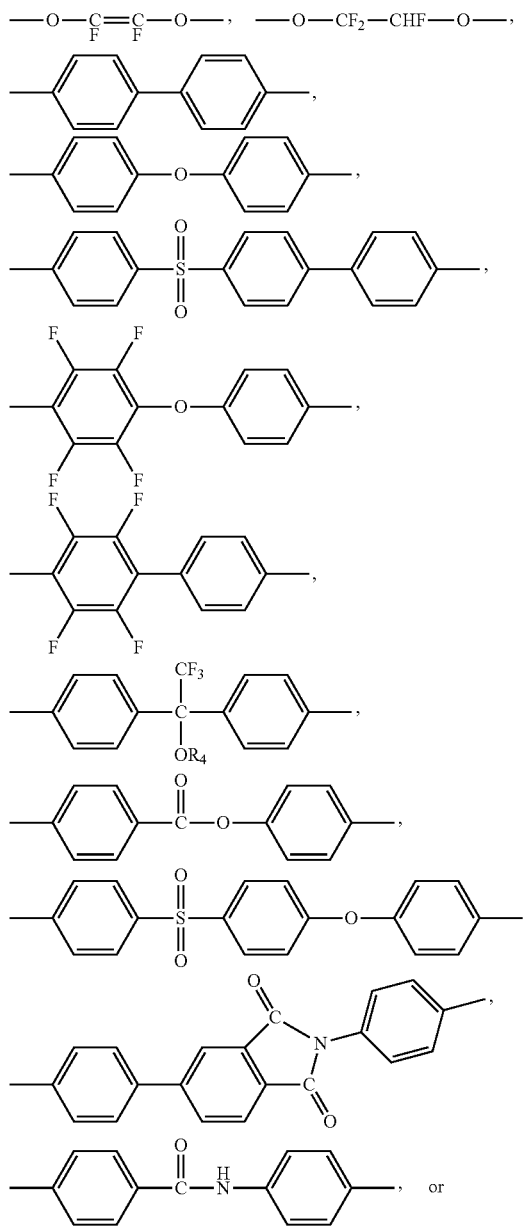

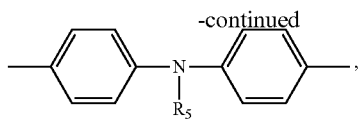

where $R_5$ is an organic group, such as an alkyl or acyl group.

The ionic conductivity of the polymers set forth above is determined by the concentration of sulfonic acid groups in the copolymer molecule. Concentration of sulfonic acid group may be experimentally determined or calculated in terms of ion exchange capacity (IEC), in the unit of milliequivalent per gram (meq/g). IEC of a known polymer structure may be calculated by simply dividing the molar equivalent of sulfonic acid groups in a polymer molecule by the molecular weight of the polymer, and multiplying the result by 1000. For sulfonated polymers with unknown degree of sulfonation, IEC can be determined experimentally. The experimental procedure for determining IEC is fully described in U.S. Pat. No. 7,094,851. By controlling the molar ratio of sulfonated/sulfonatable monomer to the un-sulfonated monomer and the degree of sulfonation, one can obtain an IEC of about 0.1 to about 8 meq/g for the sulfonated copolymer. The copolymer having an IEC of about 1 to about 4 meq/g exhibits high ionic conductivity and yet good mechanical properties at high relative humidity.

In another variation of the present embodiment, $E_1$ and $E_2$ include one or more aromatic rings. For example, $E_1$ and $E_2$, include one or more of phenyl, biphenyl, terphenyl, naphthalenyl, phenanthrenyl, diphenyl ether, 9,9'-diphenylfluorene, diphenylsulfide, diphenylcyclohexyl methane, diphenyldimethylsilane, α-methylstilbene, hydroquinone diphenyl ether, sulfonated phenyl, α-methylstilbene, diphenylcyclohexyl methane or bisphenol A.

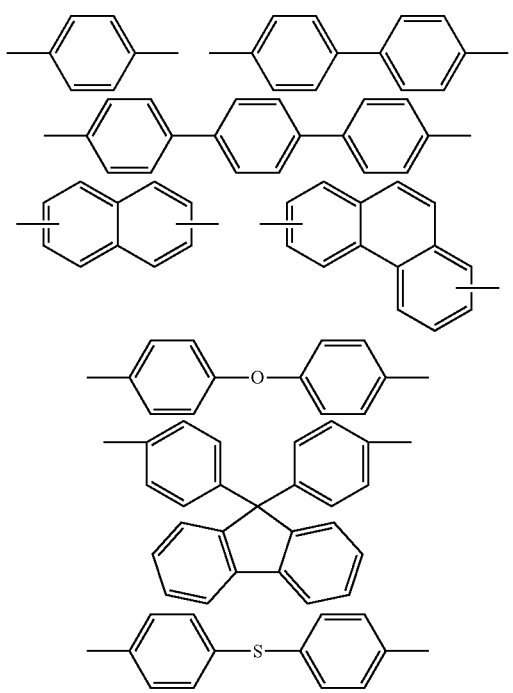

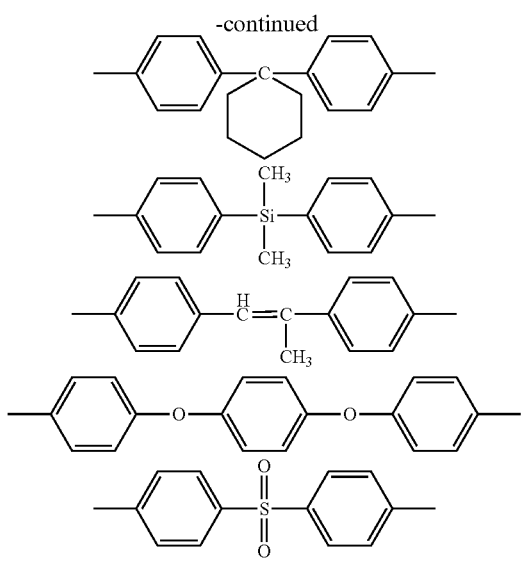
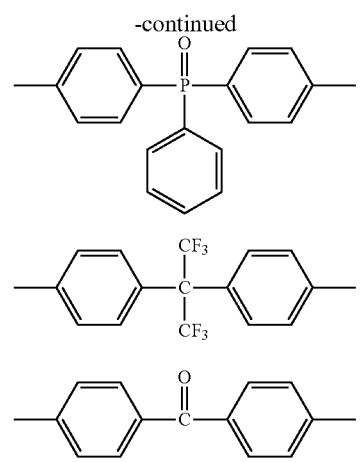
In still another variation, wherein $E_1(Z_1)_d$ or $E_2(Z_1)_f$ comprises a structure unit represented by one of the following formulae:
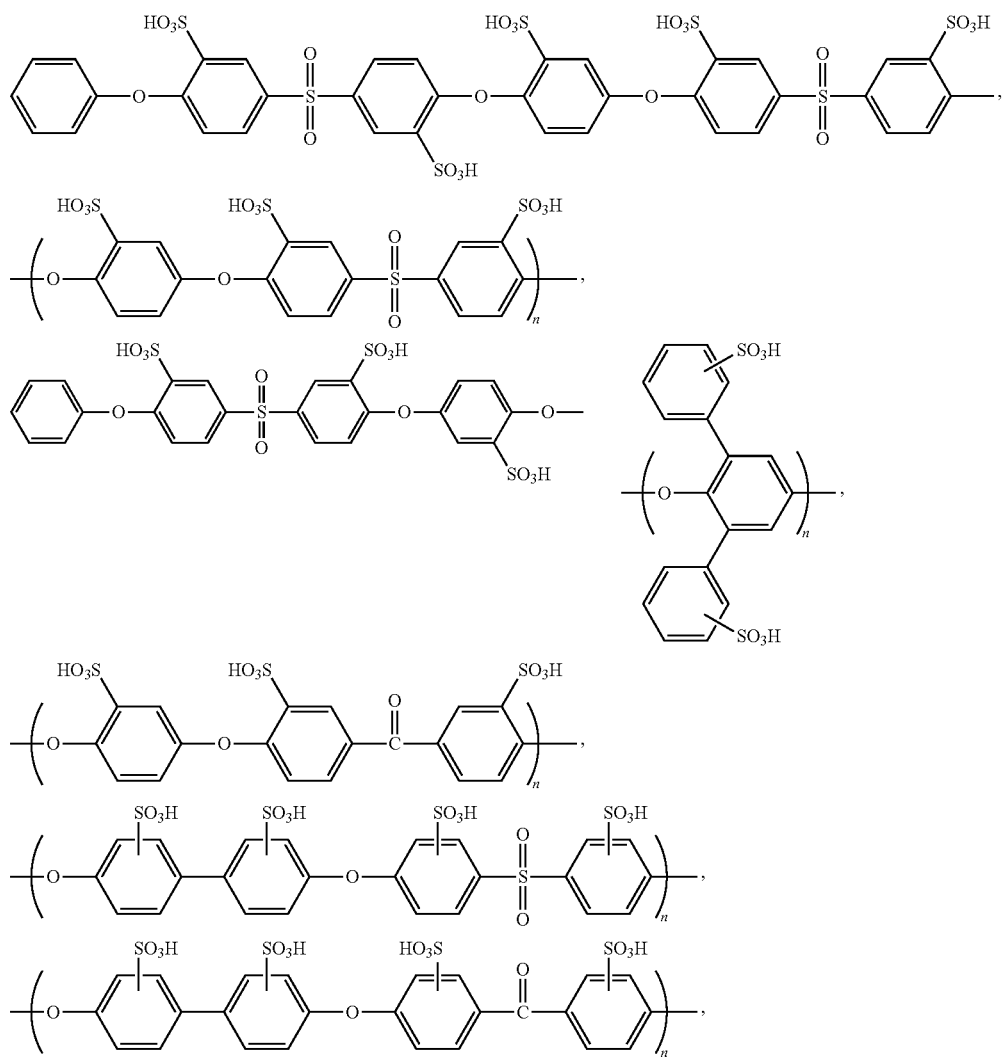

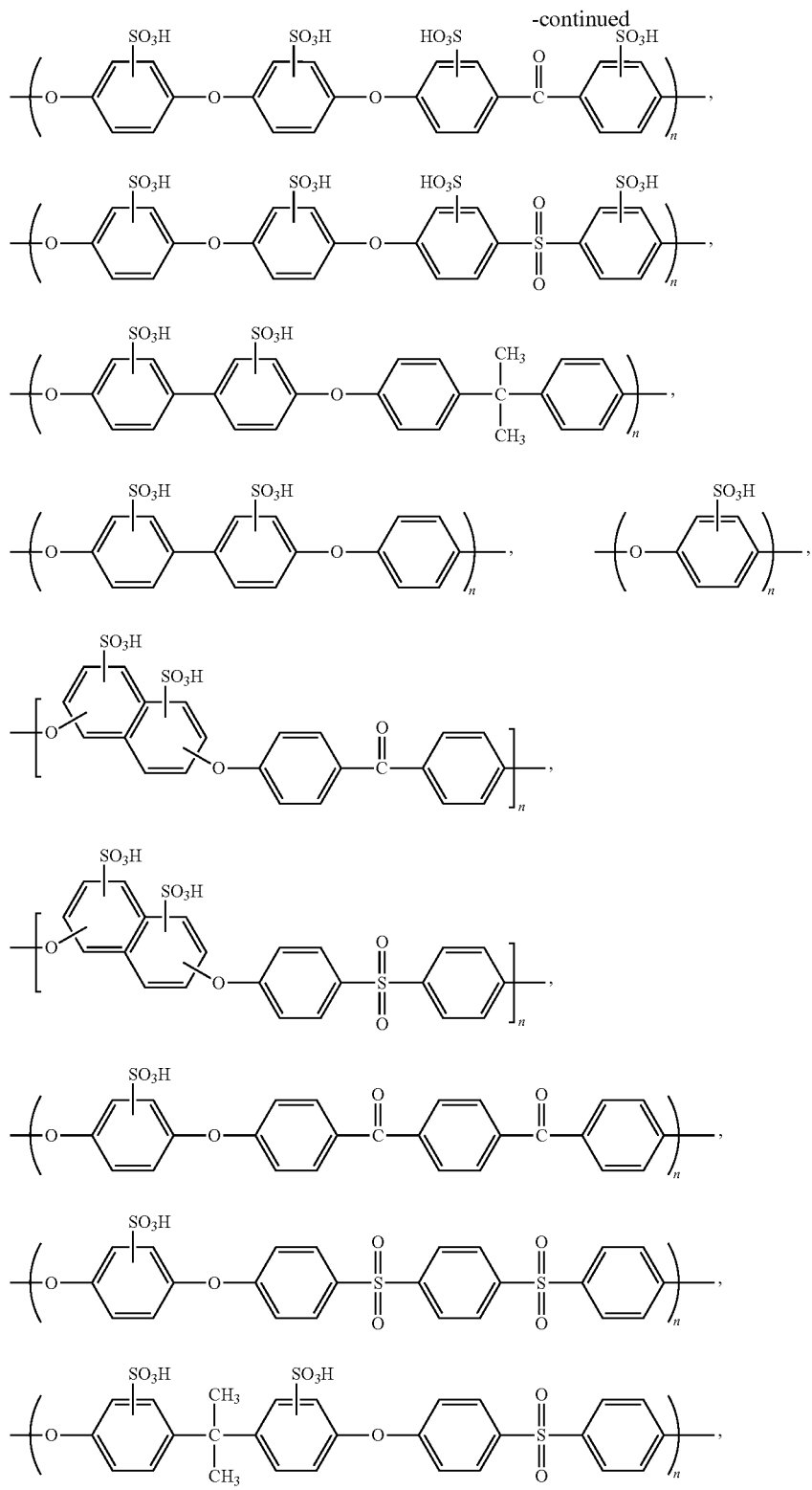

where n is a positive integer.

Figure 2A:
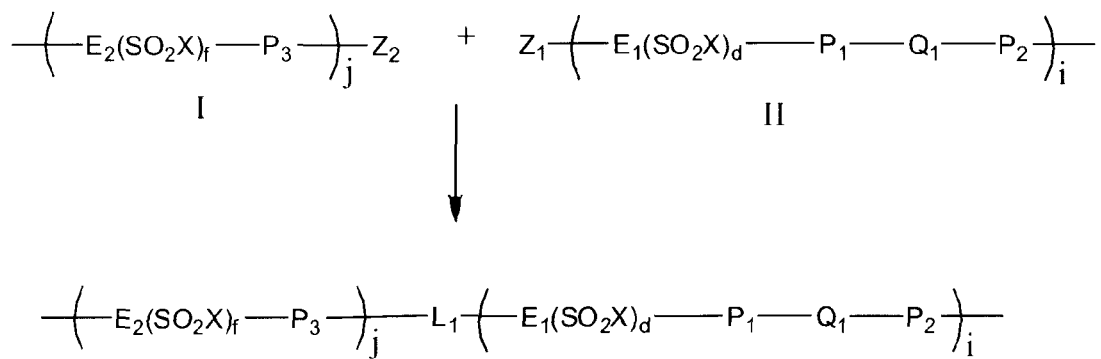
FIGS. 2A and 2B provide synthetic schemes for preparing the polymers of the present embodiment by coupling pre-polymers I and II or pre-polymers I' and II'.
Figure 2B:
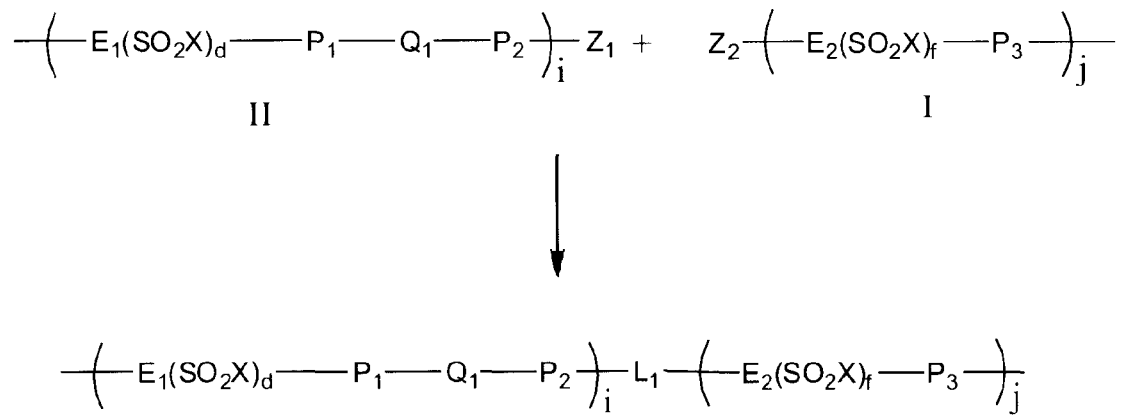

FIGS. 2A and 2B provide synthetic schemes for preparing the polymers of the present embodiment by coupling pre-polymers I and II or pre-polymers I' and II'. In these figures $E_1$, $E_2$, $L_1$, $P_1$, $P_2$, $P_3$, $P_4$, $Q_1$, $Q_2$, and d are as set forth above and $Z_1$ and $Z_2$ are reactive end groups. The reactive end groups of the pre-polymers react with each other, resulting in linking group $L_1$ between the pre-polymers. There are no limitations on the chemical structure of the linking group. Various linking groups, for examples, may be formed as the product of reactions between different end groups described above. The chemical reactions between the end groups may include, but not limited to, Suzuki coupling reaction, Grignard reagent coupling reactions, Friedel-Crafts reaction, condensation reactions (between an acid and an alcohol, an acid and an amine, for examples), addition reactions (e.g., epoxy adducts), electrophilic substitution reactions, nucleophilic substitution reactions, radical coupling reaction, and imidization reactions. FIGS. 3A and 3B provides a table providing representative examples for $Z_1$, $Z_2$, and $L_1$.

The following examples illustrate the various embodiments of the present invention. Those skilled in the art will recognize many variations that are within the spirit of the present invention and scope of the claims.

Polymeric bisphenols, such as phenoxy-terminated polysulfone are prepared and allowed to react with bis(trifluorovinyloxy)-terminated-perfluorocyclobutane polymers. Examples of this polymerization process are described in S. T. Iacono, S. M. Budy, D. Ewald and Dennis W. Smith, Jr., *Chem. Commun.*, 2006, 4844-4846. These polymers have the acronym FAVE which stands for fluorocyclobutane aryl ether-vinyl ether polymers. The FAVE precursor polymers are available from Tetramer Technologies (Pendleton, S.C.), are as follows.

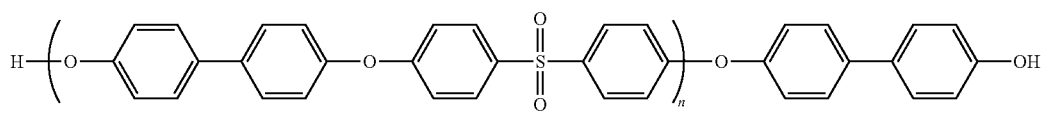

Phenoxy-Terminated Polysulfone (Mn~5000)

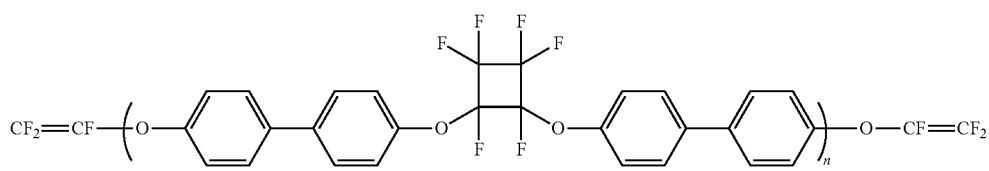

di- or bis(trifluorovinyloxy)-terminated-BPVE-pefluorocyclobutane polymer
(Tetramer Technologies, Pendleton, SC)
(Mn~8,000)

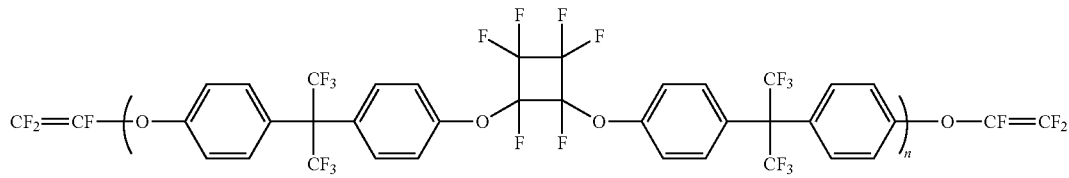

di- or bis(trifluorovinyloxy)-terminated-6F-pefluorocyclobutane polymer
(Tetramer Technologies, Pendleton, SC)
(Mn~3,500)

Preparation of BPVE-PPSU Block Copolymer

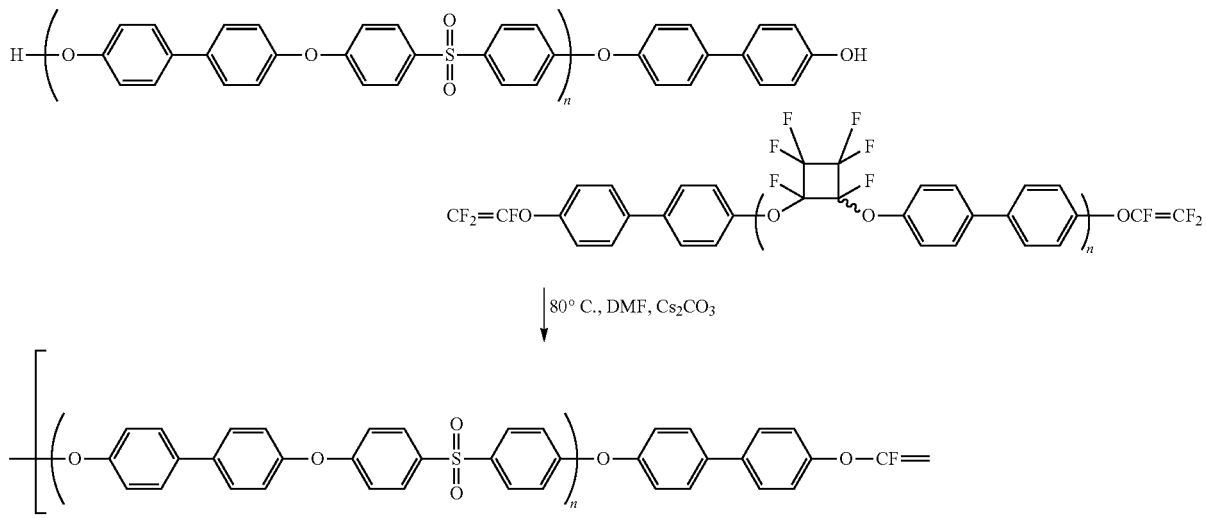

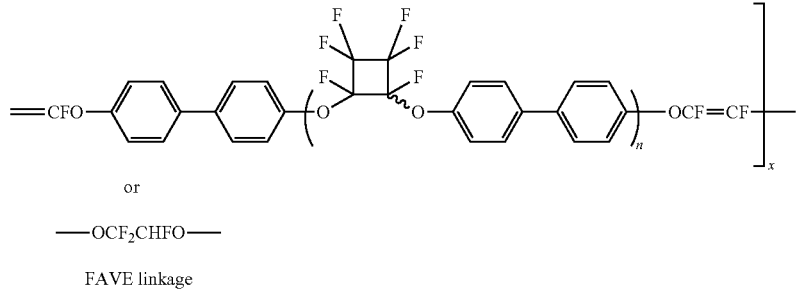

or

—OCF₂CHFO—

FAVE linkage

To a 250-mL, one-neck, round bottom flask with magnetic stirring is added DMF (70 mL), BPVE oligomer (12.6 gram, Mn 8,000, Tetramer Technologies, Pendleton, S.C.), and hydroxy-terminated polyphenylsulfone oligomer (PPSU, 7 gram, Mn=5,000). (Note: The stoichiometry is calculated based on this number average molecular weight.) Then $Cs_2CO_3$ (0.7 gram, Sigma-Aldrich, 99.9% purity) is added to the reaction mixture. Both PPSU and BPVE oligomers are not very soluble in DMF, and the $Cs_2CO_3$ did not dissolve completely. The reaction temperature is raised to 90° C. (oil bath temperature) and kept there for 24 hours under nitrogen. After complete reaction, the solution is added to methanol (1500-mL), and the precipitated polymer is filtered under mild vacuum, and washed repeatedly with methanol in order to remove the DMF residue. Then, the solid polymer is dried overnight under vacuum at 90° C. to afford the BPVE-PPSU block copolymer (18 g, 92% yield), with a number average molecular weight Mn=43,500, as determined by gel permeation chromatography (GPC) in $CHCl_3$.

Sulfonation of FAVE Polymer Consisting of 8,000-Mn Segments of BPVE-Oligomer and 5,000-Mn Segments of Polysulfone) with 30 Wt. % Oleum.

Figure 4:
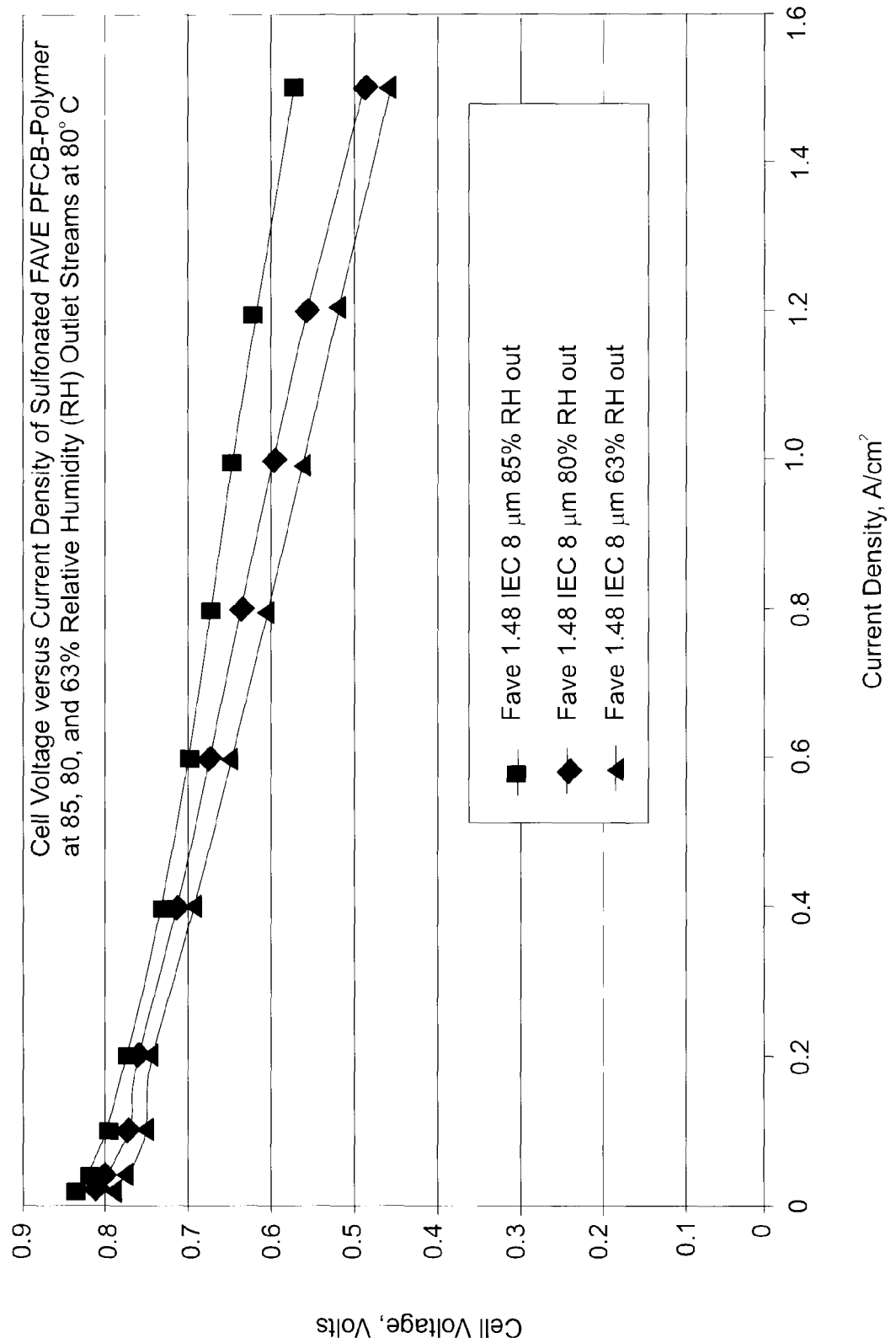
FIG. 4 is a plot of the fuel cell voltage versus the current density for an embodiment of the present invention.

FAVE polymer (1 gram) in methylene chloride (10 mL) is roll-milled in a Wheaton screw-cap jar (30-mL capacity) for 16 hours and then 30 wt. % oleum (1.33 g) is rapidly added. The jar and contents are vigorously shaken for 30 seconds and then roll milled for 45 minutes. The liquid layer is decanted off from the purple colored polymer that precipitates. The polymer is added to water (75 mL) and chopped in a Waring blender until white to yellow crumbs are obtained. More water (1 L) is added and the polymer is filtered, washed with more de-ionized water, and then air dried. The polymer (0.8 g) in N,N-dimethylacetamide (6 g) is pressure filtered through a 0.5-micrometer Teflon® Millipore filter. The yellow solution is then centrifuged to remove air bubbles and then is coated onto window-pane glass using an Erichsen coater with a heated platen set at 80° C. and a Bird applicator with an 8-mil coating gap. After drying at 80° C., the sulfonated film is floated off the glass by immersion in water and then the free-standing membrane is air-dried. The film had an ion exchange capacity of 1.48H⁺-milliequivalents per gram as determined by titration with 0.0108 M sodium hydroxide solution. The 8-micrometer film is successfully evaluated in a hydrogen-air fuel cell membrane using 0.4-mg/cm²-platinum on carbon (Tanaka) catalyst electrodes coated on carbon fiber paper diffusion media with a sintered-carbon black-Teflon® particle, microporous layer. Results are shown in the Figure shown below. Fuel cell operation is as follows (anode/cathode conditions): 2/2 $H_2$/air stoichiometries, 50%/50% RH inlets, 80° C., 75 kPa, with an overall outlets relative humidity of 85%. These results compare favorably to those measured with commercially available, perfluorosulfonic acid membranes (FIG. 4).

Preparation of 6F-PPSU Block Copolymer

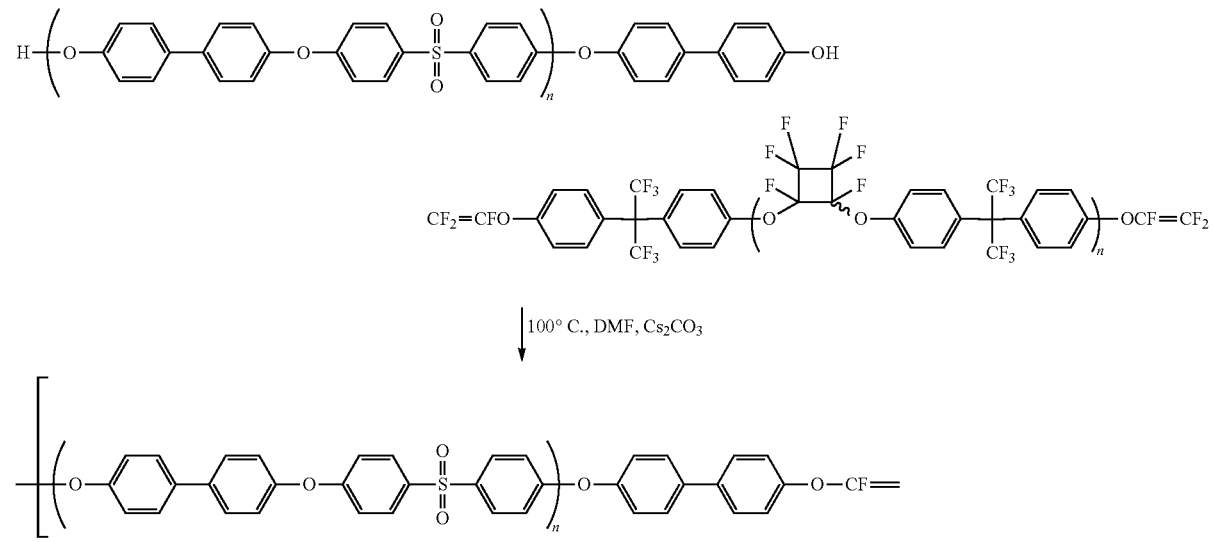

-continued

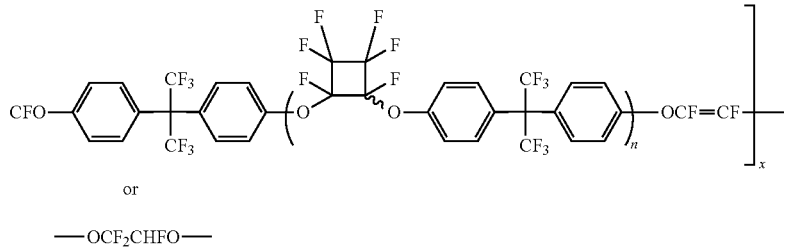

or

—OCF$_2$CHFO—

The procedure followed to make 6F-PPSU block copolymers is similar to the one above that is used to prepare BPVE-PPSU. To a 100 mL, one-neck round bottom flask with magnetic stirring is added DMF (50 mL), 6F oligomer (4 gram, Mn 3,500, Tetramer Technologies), hydroxy-terminated PPSU block oligomer (5 gram, Mn=5,000), and Cs$_2$CO$_3$ (0.5 gram, Sigma-Aldrich, 99.9% purity). Then the reaction temperature is heated at 100° C. (oil bath temperature) for 24 hours under nitrogen. After complete reaction, the solution is added to methanol (1000 mL), and the coagulated polymer is vacuum filtered and washed repeatedly with methanol to remove the DMF residue. Then, the polymer is dried overnight under vacuum at 90° C. to afford the 6F-PPSU block copolymer (8.1 g, 90% yield) with Mn=44,300 (by using GPC in CHCl$_3$).

FAVE Sulfonation with Chlorosulfonic Acid Sulfonation of FAVE Polymer (Consisting of 3,500-Mn Segments of 6F Oligomer and 5,000-Mn Segments of Polysulfone) with Chlorosulfonic Acid.

A screw-cap jar (100-mL capacity) containing a magnetic stir bar and the FAVE polymer (2 grams) in methylene chloride (40 mL) is placed on a digital hot plate set at 40° C. The polymer solution is stirred for 16 hours, and then it is heated to an internal temperature of 36° C. Chlorosulfonic acid (5.154 grams for a 2.5 weight ratio of chlorosulfonic acid to the weight of polymer) is rapidly added. A purple polymer separated from the reaction mixture. One hour after the addition of the chlorosulfonic acid, the brown reaction solvent is decanted off from the purple polymer that precipitates, and the polymeric residue is washed with methylene chloride (40 mL) with manual stirring using a Teflon coated stirring rod. The methylene chloride is decanted off and the polymeric residue is chopped in a Waring blender with a minimal amount of water (ca 50 mL) until the polymer turned white. The polymer is washed with 1 liter of water, filtered, and then suspended in water (2500-mL) in a 4-L beaker with magnetic stirring. After boiling in water for 1 hour, the polymer is isolated by filtration, washed with water and then air-dried to yield 1.97 grams of sulfonated polymer. The polymer (0.9 gram) would swell but not dissolve in N,N-dimethylacetamide (8 grams), isopropanol, and in any of the typical organic solvents tried. Therefore, this polymer is presumed to be cross-linked and could not be solution cast into a membrane.

Sulfonation of FAVE Polymer (Consisting of 3,500-Mn Segments of 6F-Oligomer and 5,000-Mn Segments of Polysulfone) with 30 Wt. % Oleum.

The FAVE polymer (1 g) in methylene chloride (10 mL) is roll milled for 16 hours and then 30 wt. % oleum (1.29 g) is added. A yellow polymer immediately crashed out of solution and did not change to purple. After 1 hour, the liquid layer is decanted off and discarded, and the polymeric residue is washed with water with chopping in a Waring blender. The polymer is filtered, washed with water and air-dried. The dried polymer (0.8 g) readily dissolved in N,N-dimethylacetamide (6.5 g).

The resultant solution is pressure-filtered through a 5-μm Millipore Teflon filter, centrifuged to remove air bubbles and then coated on window-pane glass with a Bird applicator having an 8-mil gap. After drying at 80° C., the sulfonated film is floated off the glass by immersion in water and then the free-standing membrane is air-dried. The resulting porous film appeared to be inhomogeneous and had pinholes.

The reaction is repeated with the FAVE polymer (1 g) in methylene chloride (20 mL) under the same reaction conditions. The yield of sulfonated polymer is only 0.61 g and the resultant light-yellow solution in N,N-dimethylacetamide (6 g) is turbid even after filtration. When this solution is coated onto glass, dried at 80° C., and then floated off the glass by immersion in water, a highly porous, free-standing, white film is obtained after air-drying.

Polycondensation of Activated Halogen Endcapped 8,000-Mn Segments of BPVE-Oligomer and 5,000-Mn Segments of Polysulfone)

Activated encapped 5,000-Mn Segment of BPVE oligomer: Biphenyl trifluorovinyl ether (BPVE) monomer (10.00 g, 28.90 mmol), 4-fluorophenylsulfone-phenyl trifluorovinylether (0.74 g, 0.068 mmol) and diphenyl ether (50 g) (DPE) are mixed together and degassed with Ar for about 1 hour at 75° C. The reaction mixture is then heated at 180° C. overnight, or until the molecular weight ceases to increase. The reaction is carried out in a 1 L stainless steel reactor with mechanical stirring (stainless steel stirrer rod and a Teflon blade) and condenser. The pre-polymer is diluted with 60 ml of tetrahydrofuran (THF), precipitates to 500 ml of methanol and collected on Teflon filter paper.

Polymerization via the carbonate process: Difluorophenylsulfone endcapped 5,000-Mn segment of BPVE oligomer (10.00 g); hydroxyl-terminated polysulfone (5.00 g), N,N'-dimethylacetamide (75 g) and toluene (10 g) are charged in a 3-necked round bottom glass flask equipped with a stirrer, argon inlet and Dean Stark trap with a condenser. Potassium carbonate (3.0 g) is added and the reaction mixture is heated until toluene begins to reflux and the temperature is maintained for 1 hour. The reaction temperature is increased to 165° C. and maintained until polymerization growth ceases, as monitored by gel permeation chromatography. At the end of the reaction, the viscous solution is cooled to 60° C. and diluted in CHCl$_3$ (50 g) at 40° C. with increased stirring speed. The polymer solution is filtered through a Teflon filter cloth and precipitates by slowly pouring into methanol (1 L) while agitating with a magnetic stirrer. The polymer is collected on filter paper and a Soxhlet extraction is performed with methanol to remove traces of N,N'-dimethylacetamide from the copolymer Sulfonation and Membrane Preparation: One gram of the polymer above is dissolved in methylene chloride (Aldrich, catalog number 61005-0040, 10 mL) is centrifuged for 15 minutes. The clear supernatant solution is decanted off from the sediment, which is a white insoluble gel. The resultant solution (9.7 g) is magnetically stirred in a 30-mL, glass, screw cap jar with a Teflon face lined lid. Chlorosulfonic acid (Aldrich, 2.5 g) is added and the reaction mixture immediately turns purple and a polymeric residue forms. After 60 minutes, the methylene chloride solvent is decanted off from the purple polymer that precipitates out of the reaction mixture. The purple precipitate is washed with water using a Waring blender until a white polymer is obtained and boiled for 1 hour in deionized water. The polymer is collected by filtration and air-dried. The polymer (0.8 g) in N,N-dimethylacetamide (6 g) is pressure filtered through a 0.5-micron Teflon Millipore filter and the yellow solution is coated on window-pane glass using an Erichsen coater set at 80° C. with an 8-mil Bird bar applicator. The film is successfully evaluated in a hydrogen-air fuel cell membrane using 0.4 mg/cm²-platinum on carbon (Tanaka) catalyst electrodes coated on carbon fiber diffusion media with a sintered-Teflon particle, microporous layer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polymer comprising polymer segments 1 and 2:

$$E_1(Z_1)_d\text{—}P_1\text{-}Q_1\text{-}P_2 \quad [1]$$

$$E_2(Z_1)_f\text{—}P_3 \quad [2]$$

wherein:

$Z_1$ is —SO₂X, —PO₃H₂, or —COX;

$E_1$, $E_2$ is an aromatic or aliphatic-containing moiety wherein at least one of $E_1$ and $E_2$ include an aromatic substituted with $Z_1$;

X is an —OH, a halogen, an ester, or

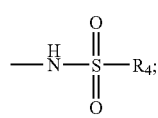

d is the number of $Z_1$ functional groups attached to $E_1$;
f is the number of $Z_1$ functional groups attached to $E_2$;
$P_1$, $P_2$, and $P_3$ are each independently absent, —O—, —S—, —SO—, —SO₂—, —CO—, —NH—, NR₂—, or —R₃—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero; and when f is greater than zero, d is zero.

2. The polymer of claim 1 wherein $Q_1$ and $Q_2$ are each independently a perfluorocyclobutyl moiety.

3. The polymer of claim 1 wherein $Q_1$ and $Q_2$ are each independently:

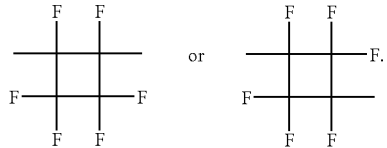

4. The polymer of claim 1 wherein polymer segments 1 and 2 are repeated to form polymer units 3 and 4:

$$-(E_1(Z_1)_d\text{-}P_1\text{-}Q_1\text{-}P_2)_i- \quad [3]$$

$$-(E_2(Z_1)_f\text{-}P_3)_j- \quad [4]$$

wherein:

i is a number representing repetition of polymer segment 1 to define polymer unit 3; and j is a number representing repetition of a polymer segment 2 to define polymer unit 4.

5. The polymer of claim 4 wherein i and j are each independently from 1 to 500.

6. The polymer of claim 4 wherein i and j are each independently from 1 to 200.

7. The polymer of claim 3 wherein polymer units 3 and 4 are linked to form one or both of the following polymer units:

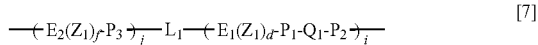

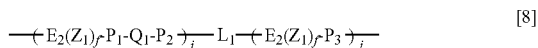

where $L_1$ is absent or a linking group.

8. The polymer of claim 7 wherein segments 7 and 8 are repeated to form:

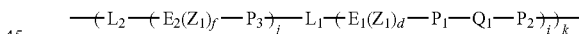

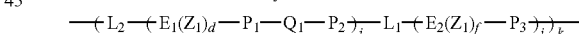

where $L_2$ is absent or a linking group and k is an integer number representing repetition of the polymer segment 3.

9. The polymer of claim 8 wherein $L_1$ and $L_2$ each independently comprise an ether, imide, amide, ester, amine, ketone or acyl groups.

10. The polymer of claim 8 wherein $L_1$ and $L_2$ each independently comprise a chemical structure represented by one of the following formulae:

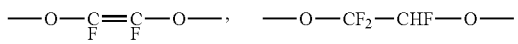

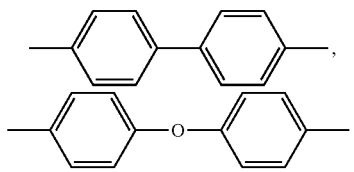

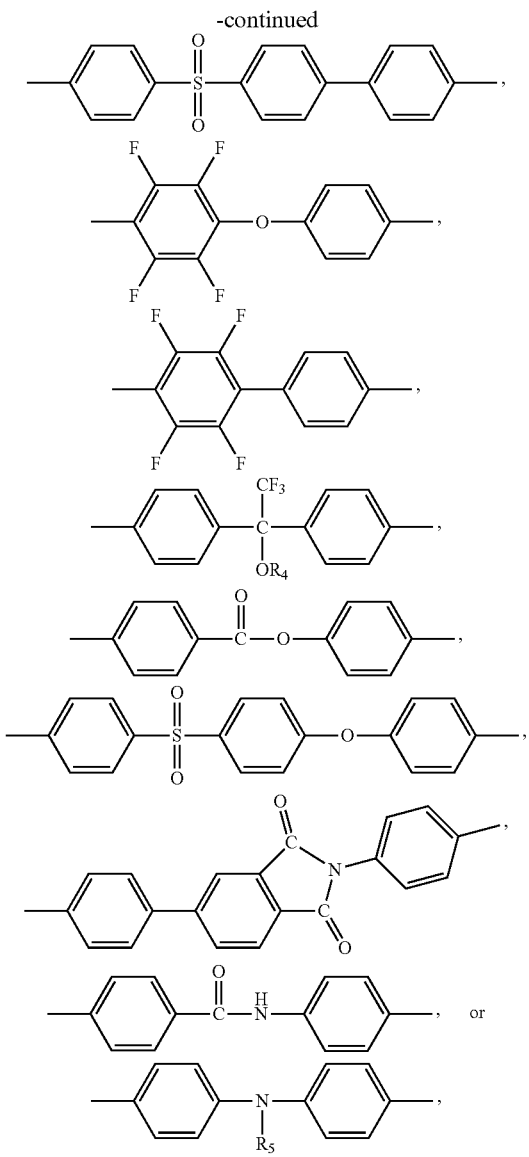
where R_5 is an organic group, such as an alkyl or acyl group.
11. The polymer of claim 1 wherein $E_1$ and $E_2$ each independently comprises a structural unit represented by one of the following formulas:
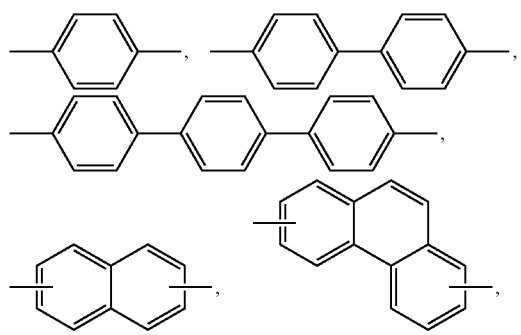
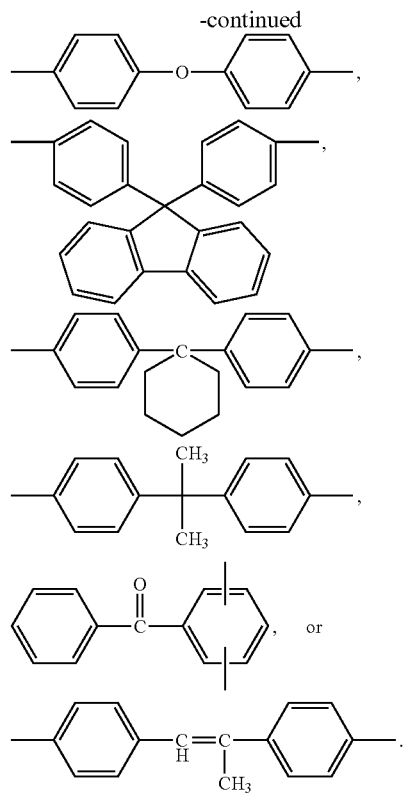
12. The polymer of claim 1 wherein $E_1$ and/or $E_2$ comprises a structural unit represented by one of the following formulas:
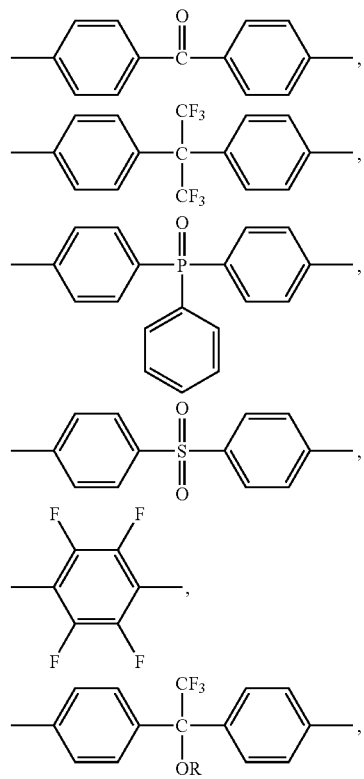

-continued
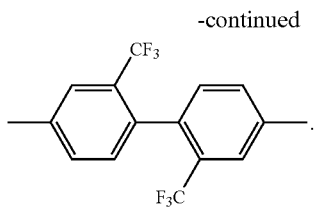
13. The polymer of claim 1 wherein $Z_1$ is present at about 1 meq/g or greater.
14. The polymer of claim 1 wherein $E_1$ comprises at least one phenyl or phenylene group to which $Z_1$ is directly attached.
15. The polymer of claim 1 wherein $E_1(Z_1)_d$ or $E_2(Z_1)_f$ comprises a structure unit represented by one of the following formulae:
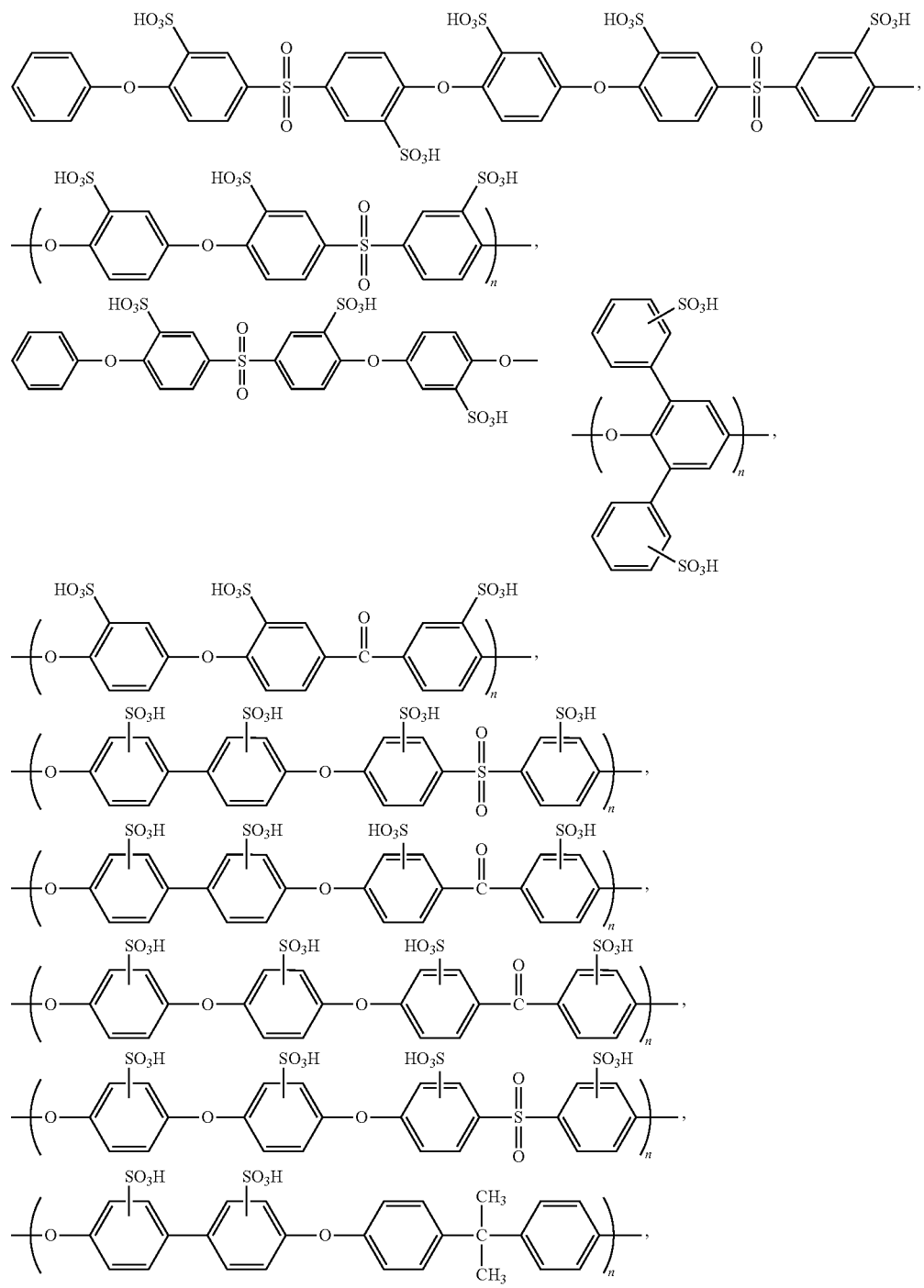

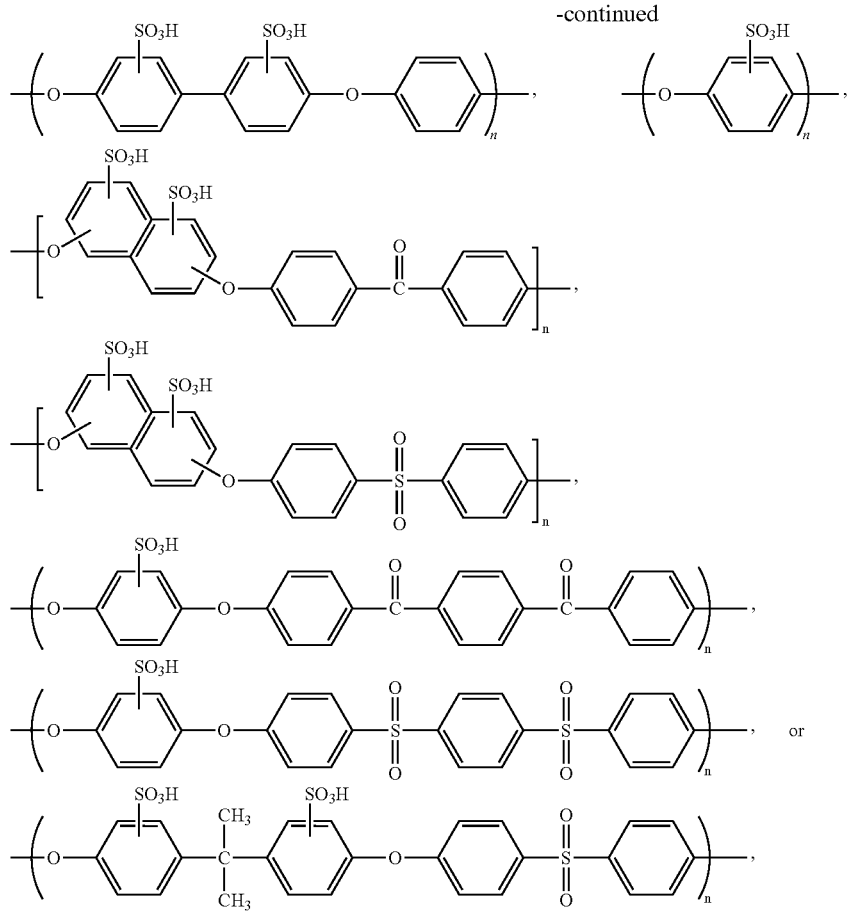
where n is a positive integer.